W. H. HOVEY.
Corn Sheller.
No. 23,686.
Patented April 19, 1859.
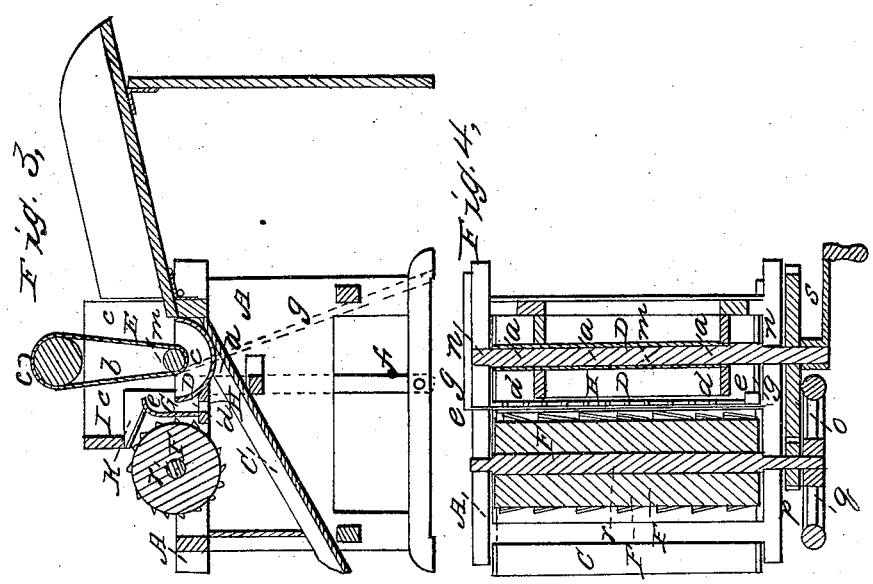
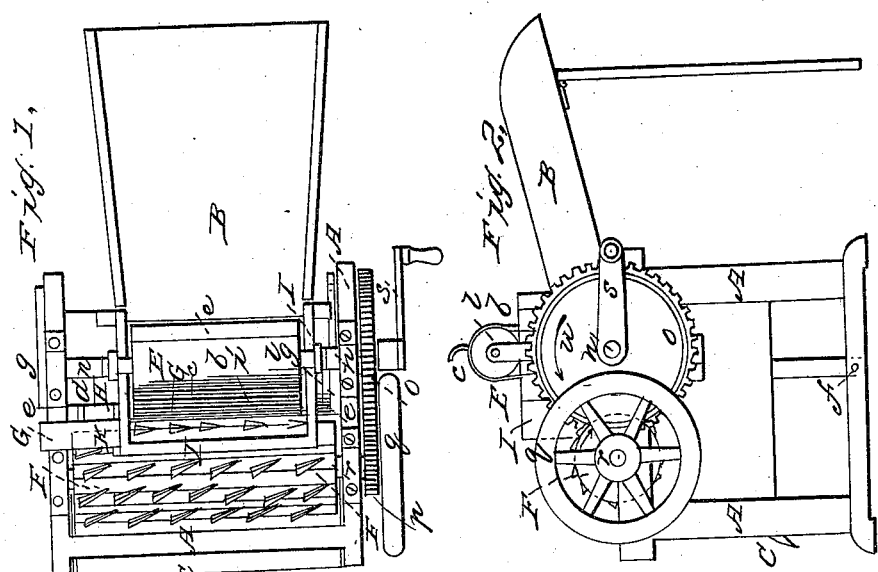

UNITED STATES PATENT OFFICE.

WILLIAM H. HOVEY, OF SPRINGFIELD, MASSACHUSETTS.

CORN-SHELLER.

Specification of Letters Patent No. 23,686, dated April 19, 1859.

*To all whom it may concern:*

Be it known that I, WILLIAM H. HOVEY, of Springfield, in the county of Hampden and State of Massachusetts, have invented an Improved Machine for Shelling Corn; and I do hereby declare that the same is fully described and represented in the following specification and the accompanying drawings, of which—

Figure 1, is a top view of it; Fig. 2, a side elevation; Fig. 3, a vertical and longitudinal section. Fig. 4, is a horizontal section taken through the axis of the shelling drum.

In such drawings, A denotes the frame of the machine, as provided with a supplying spout B, and a discharging chute C, which are arranged in such frame as shown in Fig. 3. Directly in front of the spout B, and over the rear or upper part of the said chute is a curved grid or grated trough D, provided with openings *a*, which serve to discharge upon the chute any kinds of corn or other loose matters which may get into the trough D.

An endless elevator or conveyer E, is arranged with respect to the spout B, and the trough D, as shown in Fig. 3, and is composed of an endless apron *b*, furnished with a series of long troughs or buckets *c, c, c*, arranged on it as shown in the drawings. While being carried through the grid or trough D, the buckets serve as scrapers to remove any large pieces of cob or matters which may not pass through the grates, such matters being raised by the buckets and discharged over into the space between a shelling cylinder or drum F, and a spring presser G, which are not only arranged in reference to the elevator as shown in Fig. 3, but are provided with a grate or perforated bar H, which is disposed immediately underneath the presser G, and over the chute. The perforations *d, d, d*, of the bar H, are to permit kernels of corn that may be removed from the cob of an ear by the cylinder F, to escape downward upon the chute while the ear is supported on such bar and forced up to the shelling cylinder by the presser. The said presser G, is a metallic plate supported by two arms or levers *e, e*, each of which turns at its lower end on a fulcrum *f*, and has a spring *g*, applied to it so as to press it toward the shelling cylinder.

A part of the upper edge of the presser or that part thereof which is within a guide hopper I, (arranged in front of the elevator and over the shelling cylinder as shown in Figs. 1, 2, and 3) is turned or bent backward as shown at *i*, in Fig. 3. Furthermore, another part of the presser is bent forward as shown at *k*, in Figs. 1, and 2. While the object of the first of these bends is to facilitate the passage of the ear of corn between the presser and the cylinder while such ear may be falling from one of the buckets of the elevator, the object of the other bend, or that marked *k*, is to keep the butt end of the ear from slanting upward as it passes beyond the guide hopper.

The elevator is supported on two drums *l, m*, the lower of which is fixed on the driving shaft *n*, on which is a gear wheel *o*, that engages with a pinion *p*, carried by the shaft *r*, of the shelling cylinder. A fly wheel *q*, is fixed on the shaft *r*, a crank *s*, being attached to the shaft *n*.

The teeth of the shelling cylinder are arranged in helical rows around the same, and so that each tooth shall not only lap by that next to it in its row, but its front cutting edge be inclined so as to cut or act with a drawing stroke in two directions each tooth being a triangular pyramid having one face lying on and jointed to the surface of the cylinder, the whole being as shown in the drawings. This mode of forming and arranging the teeth enables them to operate to excellent advantage not only in removing the kernels of corn from the cob, but in discharging the cob endwise out of the machine.

In operating with the said machine the ears of corn are to be thrown or poured into the spout B, by any proper means. The crank *s*, being turned so as to put the said gear in movement in the direction indicated by the arrow *u*, (see Fig. 1), the ears of corn will be removed from the spout by the elevator and dropped into the space between the presser and the shelling cylinder when they will be subjected to the action of the latter and will have their kernels or seeds removed from the cob, the latter being discharged endwise out of the machine. The kernels will fall down upon the chute, and thus the machine will not only remove the kernels from the cob, but separate one from the other into two different piles or heaps.

I claim—

1. The arrangement and combination of the endless elevator E, the spout B, the spring presser G, and the shelling cylinder F, in the manner described.

2. I also claim the arrangement and combination of the grated trough D, with the elevator E, and the mechanism for removing the kernels from the cobs and separating both kernels and cobs as described, such mechanism consisting mainly of the presser G, the shelling cylinder F, and the grid or bar H, arranged and coöperating as specified.

3. I also claim the combination and arrangement of the guide hopper or receiver I, with the shelling mechanism, the grated trough D, and the elevator E, in the manner and for the purpose specified.

WM. H. HOVEY.

Witnesses:
J. M. STEBBINS,
GEO. A. GROVER.